(No Model.)
J. H. MELICK & M. J. COLBERT.
TREAD AND RAILWAY POWER.
No. 274,510. Patented Mar. 27, 1883.
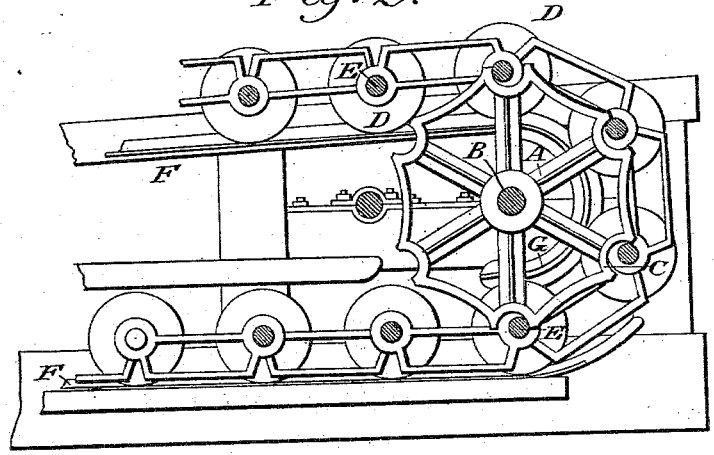
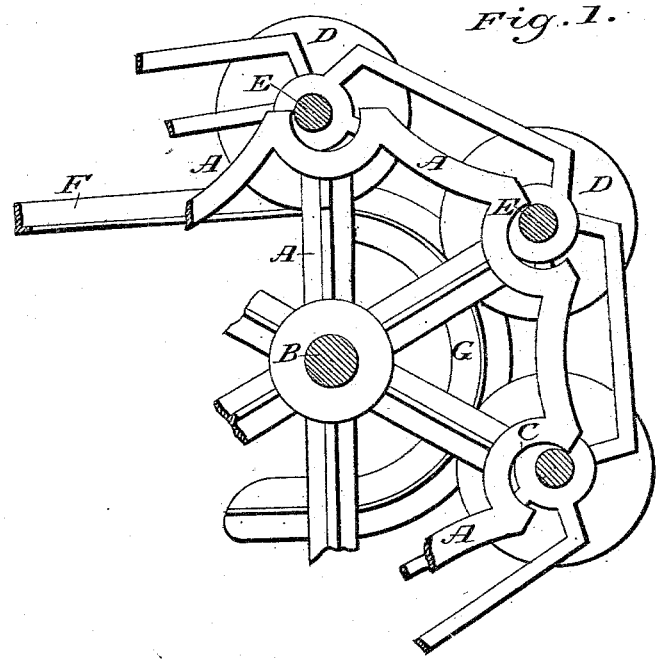

UNITED STATES PATENT OFFICE.

JAMES H. MELICK AND MICHAEL J. COLBERT, OF ALBANY, NEW YORK, ASSIGNORS TO THE WHEELER & MELICK COMPANY, OF SAME PLACE.

TREAD AND RAILWAY POWER.

SPECIFICATION forming part of Letters Patent No. 274,510, dated March 27, 1883.

Application filed December 15, 1882. (No model.)

*To all whom it may concern:*

Be it known that we, JAMES H. MELICK and MICHAEL J. COLBERT, both citizens of the United States, and residing in the city and county of Albany, and State of New York, are the joint inventors of a certain new Improvement in Tread and Railway Power; and we hereby declare that the principles, elements, and combinations in our said joint invention are hereinafter so fully described, and pointed out in the drawings accompanying this specification, that any one skilled in the art to which our invention more nearly relates may be able to construct and operate the same, reference being had to this specification, and the drawings accompanying the same.

Our joint invention relates to that class of power which is acquired by animals or human beings treading upon or walking over an inclined track or plane, which operates the wheels to which the same may be attached, and the belts or belting which pass around such wheels, and the wheels of the necessary machinery used in connection with such power.

Heretofore the reel and the axles of the small wheels which pass the reel and move upon the tracks at the side of the tread have been so constructed that the said axles fit down closely to the bottom of the hollows formed in the periphery of said reel for the reception of such axles, thereby causing the use of a very large amount of power to overcome the friction resulting from the depth of such hollows and the distance which said axles have to travel in entering and leaving such hollows, and to turn said reel, as may be instanced in the case of two geared wheels having long teeth and which operate in connection with each other, where the teeth of each wheel enters the hollow in the periphery of the other to its full length, thereby causing a rubbing friction.

The object of our invention is to reduce the friction caused by the movement of the said reel and said axles together to a minimum, and to lessen the size, weight, and number of the animals which or human beings who produce the power by walking over or treading upon said inclined plane or tread, and thereby gain power.

The manner of constructing and operating our said invention is as follows, reference being had to the accompanying drawings, in which similar letters indicate like parts, and in which—

Figure 1 is an enlarged sectional side view of the reel and small wheels and axle when the latter is in position to be acted upon by said reel and the circular track; Fig. 2, the side view of the reel, small wheels, and accompanying axles, and the circular part of the inclined track upon and over which the small wheels revolve.

A is the reel, in the hollows in the periphery of which the axles of the small wheels enter, and which is being turned upon its own axle by the axles of the smaller wheels, and which is connected by its own axle with a larger wheel upon the outside of the tread, over which the belting is passed; B, the axle of the reel A; C, the hollows in the periphery of the reel A; D, the small wheels which revolve over and upon the circular or inclined track; E, the axle of the small wheels D; F, the inclined track, upon which the small wheels also revolve; G, the circular track on the outside of the reel, and upon which the small wheels revolve.

We construct and operate our invention as follows: Having first constructed the side inclined tracks upon which the small wheels revolve and placed them in position at the sides of the tread, and underneath each other and parallel, or nearly so, in both cases with each other, we join each of the ends of said tracks, upon each side of the tread, by a semicircular track equal in width, or nearly so, with the inclined track, the diameter of which circular track shall be so great that the axles of the small wheels which pass over it cannot drop down or pass into the hollow formed in the periphery of the reel to the full depth of such hollows, but shall pass into such hollows only to such an extent as merely to make a bearing upon the reel sufficient only to turn said reel. The animals or human beings, walking upon the planking of the tread, cause the small wheels D underneath, and which support and are attached to the tread, to revolve upon the inclined track F, and also the circular track G, and as the axle E of each set of small wheels D strikes, passes, or drops into said hollows C of the reel A they cause the reel to turn, and with it the wheel upon the outside of the tread, over and upon which the belting which moves the machinery passes. By means of the said circular track G at the ends of the inclined track on either side of the tread (provided the diameter thereof is sufficiently great) the axles of the small wheels D are prevented from entering the hollows C in the periphery of the reel A to too great an extent; but, on the contrary, the axles are allowed to enter as far only as to produce a bearing sufficient to turn the reel.

Having thus fully described our said joint invention, what we claim, and desire to secure by Letters Patent, is—

1. As a new article of manufacture, a tread or railway power so constructed that in addition to the two parallel inclined tracks on each side of the tread, and over which the wheels of the tread revolve, there shall be a semicircular track at the ends of said parallel inclined side tracks, which semicircular track shall have so great a diameter as to prevent the axles of the small wheels of the tread from passing, entering, or dropping into the hollows formed in the periphery of the reel to the full depth of such hollows, and, on the contrary thereof, shall allow such axles to enter said hollows in said periphery to such an extent only as merely to make a bearing upon the reel sufficient only to turn said reel, substantially as described, and for the purposes above mentioned.

2. In a tread or railway power, the semicircular track at the ends of the inclined track constructed upon each side of such tread, and over which the wheels which support the tread shall pass, and which semicircular track shall be so constructed as to have its diameter sufficiently great to prevent the axles of the small wheels which pass over such track from passing, entering, or dropping into the hollows formed upon the periphery of the reel to the full depth of such hollows, but, on the contrary, shall merely allow the axle to come in contact with or pass into said hollows in said periphery of said reel only so far as to produce a bearing just sufficient to cause the said reel to turn on its own axle, substantially as described.

3. In a tread or railway power, the combination of the reel, the wheels which support the tread and revolve upon the track and their accompanying axle, and the semicircular track which is joined to the said inclined tracks at their ends upon each side of said tread, substantially as set forth and described.

JAS. H. MELICK.
MICH. J. COLBERT.

Witnesses:
C. LA DOW,
E. WACKERHAGEN.